(12) United States Patent
Elliott

(10) Patent No.: US 10,255,018 B2
(45) Date of Patent: *Apr. 9, 2019

(54) SMART PIXEL ADDRESSING

(71) Applicant: Barco, Inc., Duluth, GA (US)

(72) Inventor: Grant Arthur John Elliott, New Territories (HK)

(73) Assignee: Barco, Inc., Duluth, GA (US)

( * ) Notice: Subject to any disclaimer, the term of this patent is extended or adjusted under 35 U.S.C. 154(b) by 14 days.

This patent is subject to a terminal disclaimer.

(21) Appl. No.: 15/220,346

(22) Filed: Jul. 26, 2016

(65) Prior Publication Data

US 2017/0131780 A1 May 11, 2017

Related U.S. Application Data

(63) Continuation of application No. 12/484,202, filed on Jun. 13, 2009, now Pat. No. 9,400,212.

(60) Provisional application No. 61/061,338, filed on Jun. 13, 2008, provisional application No. 61/061,347, filed on Jun. 13, 2008, provisional application No. 61/061,353, filed on Jun. 13, 2008, provisional application No. 61/061,358, filed on Jun. 13, 2008, provisional application No. 61/061,365, filed on Jun. 13, 2008, provisional application No. 61/061,369, filed on Jun. 13, 2008.

(51) Int. Cl.
| | |
|---|---|
| *G06F 3/01* | (2006.01) |
| *G06F 3/03* | (2006.01) |
| *G06F 3/14* | (2006.01) |
| *G09F 9/302* | (2006.01) |
| *G01J 3/28* | (2006.01) |
| *F21V 21/088* | (2006.01) |
| *G06F 1/00* | (2006.01) |
| *G09F 9/33* | (2006.01) |
| *F21S 2/00* | (2016.01) |

(52) U.S. Cl.
CPC ............ *G06F 3/1446* (2013.01); *F21S 2/005* (2013.01); *F21V 21/088* (2013.01); *G01J 3/28* (2013.01); *G06F 1/00* (2013.01); *G06F 3/017* (2013.01); *G06F 3/0304* (2013.01); *G09F 9/3026* (2013.01); *G09F 9/33* (2013.01); *H05K 999/99* (2013.01); *Y10T 29/49826* (2015.01)

(58) Field of Classification Search
CPC ..... G06F 3/016; G06F 3/0338; G06F 3/03543
See application file for complete search history.

(56) References Cited

U.S. PATENT DOCUMENTS

| | | |
|---|---|---|
| 5,410,328 A | 4/1995 | Yoksza et al. |
| 5,686,942 A | 11/1997 | Ball |
| 6,314,669 B1 | 11/2001 | Tucker |
| 6,559,433 B1 | 5/2003 | Ozawa |
| 6,704,989 B1 | 3/2004 | Lutz et al. |
| 6,813,853 B1 | 11/2004 | Tucker |
| 7,071,620 B2 | 7/2006 | Devos et al. |

(Continued)

FOREIGN PATENT DOCUMENTS

| | | |
|---|---|---|
| KR | 10-2006-0108162 A | 10/2006 |
| KR | 10-2008-0040648 A | 5/2008 |

*Primary Examiner* — Robert J Michaud
(74) *Attorney, Agent, or Firm* — Aka Chan LLP

(57) ABSTRACT

A display unit has modular groups of light emitting elements or pixels. A light emitting element in the display unit can be used as a light receptor for accepting control information without needing to connect the display unit to a network or a controller.

22 Claims, 7 Drawing Sheets

(56) References Cited

U.S. PATENT DOCUMENTS

| | | | |
|---|---|---|---|
| 7,102,601 B2 | 9/2006 | Devos et al. | |
| 2002/0105432 A1* | 8/2002 | Pederson | B60Q 1/2611 |
| | | | 340/815.45 |
| 2003/0100837 A1 | 5/2003 | Lys et al. | |
| 2003/0117382 A1 | 6/2003 | Pawlowski et al. | |
| 2003/0122749 A1* | 7/2003 | Booth, Jr. | G09G 3/3208 |
| | | | 345/82 |
| 2003/0168668 A1* | 9/2003 | Choi | H01L 27/156 |
| | | | 257/88 |
| 2005/0243053 A1* | 11/2005 | Liess | G06F 3/0421 |
| | | | 345/156 |
| 2006/0028156 A1* | 2/2006 | Jungwirth | H05B 33/0815 |
| | | | 315/312 |
| 2006/0227085 A1 | 10/2006 | Boldt et al. | |
| 2007/0115228 A1* | 5/2007 | Roberts | G09G 3/3413 |
| | | | 345/82 |
| 2007/0176854 A1 | 8/2007 | Ward et al. | |
| 2007/0216704 A1 | 9/2007 | Roberts et al. | |
| 2007/0241988 A1* | 10/2007 | Zerphy | G06F 3/1431 |
| | | | 345/1.1 |
| 2007/0247414 A1 | 10/2007 | Roberts | |
| 2012/0098692 A1* | 4/2012 | Talstra | G08C 17/02 |
| | | | 341/176 |

* cited by examiner

SMART PIXEL ADDRESSING

CROSS-REFERENCE TO RELATED APPLICATIONS

This patent application is a continuation of U.S. patent application Ser. No. 12/484,202, filed Jun. 13, 2009, issued as U.S. Pat. No. 9,400,212 on Jul. 26, 2016, which claims the benefit of U.S. patent applications 61/061,338; 61/061,347; 61/061,353; 61/061,358; 61/061,365, and 61/061,369, all filed Jun. 13, 2008. These applications are incorporated by reference along with all other references cited in this application.

BACKGROUND OF THE INVENTION

This disclosure generally relates to display units and particularly to a display unit having groups of light emitting elements in which a data distribution system is utilized. This disclosure provides an improved method of providing interactive communication with a pixel module of such a display. This disclosure further provides improvements allowing interactive communication with the pixel modules both to aid maintenance and to provide new operational features.

Display units for entertainment, architectural, and advertising purposes have commonly been constructed of numbers of light emitting elements, such as LEDs or incandescent lamps mounted onto flat tiles. The light emitting elements may be selectively turned on and off to create patterns, graphics, and video displays for both informational and aesthetic purposes. These displays may be constructed as tiles or large panels that are assembled in position for a specific entertainment show or event or as an architectural or advertising display.

When such a display is used for an event or theatrical production, it is desirable that the display be easily removable, for example, in between scenes of a play or theatrical event, as the needs of the production dictate. Systems may use a tile based structure where a tile, typically around 61 centimeters×61 centimeters (i.e., 2 feet×2 feet), can be lifted by hand and positioned. Accurate positioning of the tiles may be a time consuming and complex process involving skilled personnel.

Displays of these types may be constructed at different resolutions where the spacing between the light emitting elements can be varied. It may also be a requirement to change this spacing at different points on the display.

Many of these systems require large numbers of light emitting elements or pixels acting independently and, thus, require robust high speed data distribution systems, often driven by computer derived data or video signals. A display constructed in this manner using modules is flexible in that it allows the user to reconfigure the display into different shapes and formats; in some cases it can also allow the replacement of a single faulty module without having to replace the entire display. However, in such a case, there is a need for a means of quickly addressing or setting the modules so that they will respond to the correct data appropriate to their physical or assigned position in the entire display.

Some methods for assigning these addresses use physical switches or settings on the module itself; a computer network which allows configuration from a master controller; or a connection scheme which can automatically allocate addresses dependant on the order of connection of modules.

It would be advantageous if there was a means to communicate with a single module without utilizing the as yet unaddressed data link.

BRIEF SUMMARY OF THE INVENTION

The present invention relates to a light emitting element in a light emitting display having the ability to be utilized as both a light emitter and light receptor. The light emitting element can receive a signal to perform a particular action and a processor can decode the signal. According to one aspect of the invention, a light emitting display unit includes a pixel module having a light emitting element, where the light emitting element is configured to both emit light and to detect light. The light emitting element may be configured to receive a signal. The signal may be a coded signal. The coded signal may be coded in pulse-width modulation, pulse-amplitude modulation, phase modulation, amplitude modulation, or frequency modulation.

In one embodiment, the light emitting display further includes an input element configured to emit the signal. The input element may include a light emitting element configured to emit the signal. The light emitting element of the input element includes a light emitting diode or a laser. The signal includes infrared radiation, ultraviolet radiation, visible light, or reflect light emitting from the light emitting element of the input element. The light emitting element of the pixel module includes a light emitting diode. The light emitting diode can include a red, green, or blue light emitting diode. In another embodiment, the light emitting display further includes a processor electrically connected to the pixel module and configured to supply an address for the pixel module.

According to another aspect of the invention, a light emitting display system includes a plurality of display units, where each of the plurality of display units includes a light emitting element configured to emit light and configured to detect light. In an embodiment, each of the plurality of light emitting elements is configured to receive a signal.

According to another aspect of the invention, a method of communicating with a light emitting display unit includes receiving a signal with a light emitting element disposed on a pixel module of the light emitting display unit, processing the signal with a processor electrically connected to the light emitting display unit, producing a request of address by the processor for the pixel module, and addressing the pixel module of the light emitting display unit based upon the request of address.

In an embodiment, the pixel module is addressed by the processor. In another embodiment, the pixel module is addressed by another processor. In yet another embodiment, the method of communicating with the light emitting display unit further includes producing the signal with a input element and authorizing the input element to communicate with the light emitting display unit.

According to another aspect of the invention, a method of communicating with a light emitting display unit includes receiving a signal with a light emitting element disposed on a pixel module of the light emitting display unit, processing the signal with a processor electrically connected to the light emitting display unit, producing an output by the processor for the pixel module, and controlling the pixel module of the light emitting display unit based upon the output.

In an embodiment of the invention, controlling the pixel module includes controlling a color of light emitted from the light emitting element of the pixel module or controlling an intensity of light emitted from the light emitting element of the pixel module. In another embodiment of the invention, the signal includes infra-red radiation, ultra-violet radiation, visible light, or reflect light emitting from the light emitting element of the input element.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
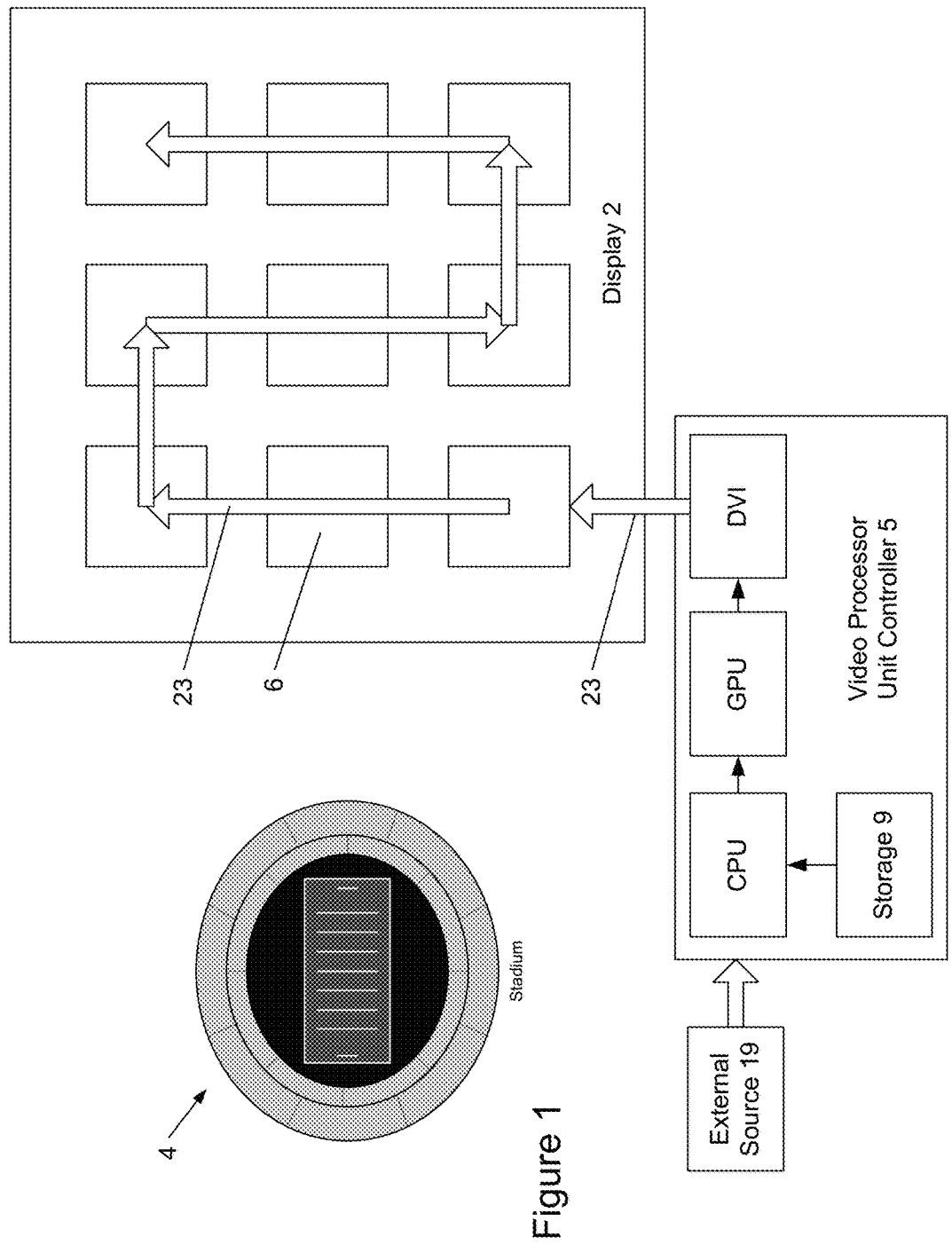
FIG. 1 shows a specific implementation of a system incorporating a technique of the invention.

FIG. 1 shows a specific implementation of a system incorporating a technique of the invention. The system has a large video display 2 that is used in such environments as a sports stadium 4 or arena (e.g., baseball, football, basketball, hockey, and soccer), concert venues and theaters, entertainments complexes, retail environments (e.g., shopping malls), outdoor venues and architectural buildings (e.g., billboards, signage, and side of buildings). For example, the display can be placed in the outfield of a baseball stadium to show video of a player at bat, highlights of the play, advertisements, and other video or graphics that provide information (e.g., statistics of the player at bat) or entertainment (e.g., show fireworks when a player hits a home run) the fans.

Display 2 is made of a number of display panels 6. The figure shows nine display panels arranged in an array of rows and columns. However, the display can have any number of panels, typically more than nine, but depending on the size of a panel, can be fewer than nine panels or even a single panel.

The panels are typically joined together and interlocked to form a single contiguous panel. The panels can be arranged and interlocked in any orientation, such as a rectangular screen in landscape orientation, a rectangular screen in portrait orientation, or a long banner strip. Panels can also be arranged into separate sections, containing gaps (such as with landscaping or fountains between each screen section), and these noncontiguous panels can be controlled simultaneously.

An implementation of a display panel is the Cobra™ display panel products by Element Labs, Inc. The display panel uses light emitting diode (LED) technology. Each pixel of the panel has four LEDs of different colors (e.g., red, green, blue, and cyan). Some more details on the Cobra products can be found in U.S. patent application Ser. No. 12/415,627, filed Mar. 31, 2009, Ser. Nos. 12/484,200 and 12/484,201, filed Jun. 13, 2009, and U.S. provisional patent applications 61/072,597, filed Mar. 31, 2008, and 61/170,887, filed Apr. 20, 2009, which are incorporated by reference.

Other display panel technologies which may be used include organic LED (OLED), liquid crystal display (LCD), plasma, digital light processing (DLP), video projection, or cathode ray tube (CRT).

The display is driven by a video processor unit controller 5, which includes a central processing unit (CPU), graphics processing unit (GPU), and Digital Visual Interface (DVI) interface output. A GPU can be connected to any number DVI ports (e.g., one, two, three, four, or five or more). If more DVI ports are needed, more GPUs can be added, each GPU being connected to additional DVI ports. The CPU and GPU process video from a source such as internal storage 9 or external storage 19.

The CPU may be one or more integrated circuit processors manufactured by Intel (e.g., Core™ 2 Duo, Core i7, or Atom), AMD (e.g., Athlon™ or Phenom™ product line), or International Business Machines Corp. (IBM) (e.g., PowerPC product line), or combinations of these.

The GPU may include one or more integrated circuits manufactured by Nvidia Corporation, Advanced Micro Devices (AMD) (e.g., ATI product line), or Intel Corporation (e.g., Intel Graphics Media Accelerator product line), or combinations of these.

In an implementation, video processor unit controller 5 communicates via a display interface such as a DVI output interface (or DVI transmitter) to display 2 and its panels via a DVI interconnection 23. The panels of the display have a DVI input interface or DVI receiver. Other display interface technologies may be used such as HDMI, DFP, DisplayPort, SDI, VGA, and others. However, display interface technologies limit a distance between controller 5 and the display because of interference and noise, which become more significant as the distance increases. Typically a DVI interface can be used for distances of about five meters (about 16 feet). Distances can be greater than five meters depending on the quality of the cabling and strength of the display interface signal transmitters.

Some large displays 2 in large venues such as a stadium may be connected using long length communication channels. When longer distances are needed, a DVI repeater or driver (which amplify the signal) or other longer communication channel technology can be used in conjunction with the DVI connection interface. In particular, the DVI interface can be converted to a fiber optic link or another twisted pair technology (e.g., Ethernet, 802.3 Ethernet over fiber optic cable, or others) by adding interface electronics in the interface path. Alternatively, the controller can be connected using another (nondisplay) interface technology such as Ethernet or USB to the display. Then controller 5 can then be located in a control booth behind and above home plate, while the display is behind center field.

The video source can be stored on internal storage 9, which can be a hard drive or solid state drive (SSD) which can be a video file or other file with instructions on what to display. Video rendering may be performed in real time by the GPU. Software or firmware executing on controller 5 reads the video file and handles performing the operations to display the video on the display. The video may be live video stream, prerecorded video, or text such as scoreboard information.

The video source may also be from external source 19, such as an external hard disk or a computer. Operation of controller 5 may by controlled using a PC and software running on the PC, which tells the controller what to do. A video file residing on the computer may be copied to the internal storage of the controller. Then the video file can be read directly from internal storage instead of from the PC or external source 119.

External source 19 may be implemented using a computer. Video processor unit controller 5 may also be implemented using, or be part of, a computer. For example, video processor unit controller 5 can be considered a specialized computer with a selection of components for video processing. Further, the video processor unit controller can be implemented as one or more plug-in peripheral boards for a computer, or housed in a separate enclosure, connected to the computer via, for example, a USB connection.

Figure 2:
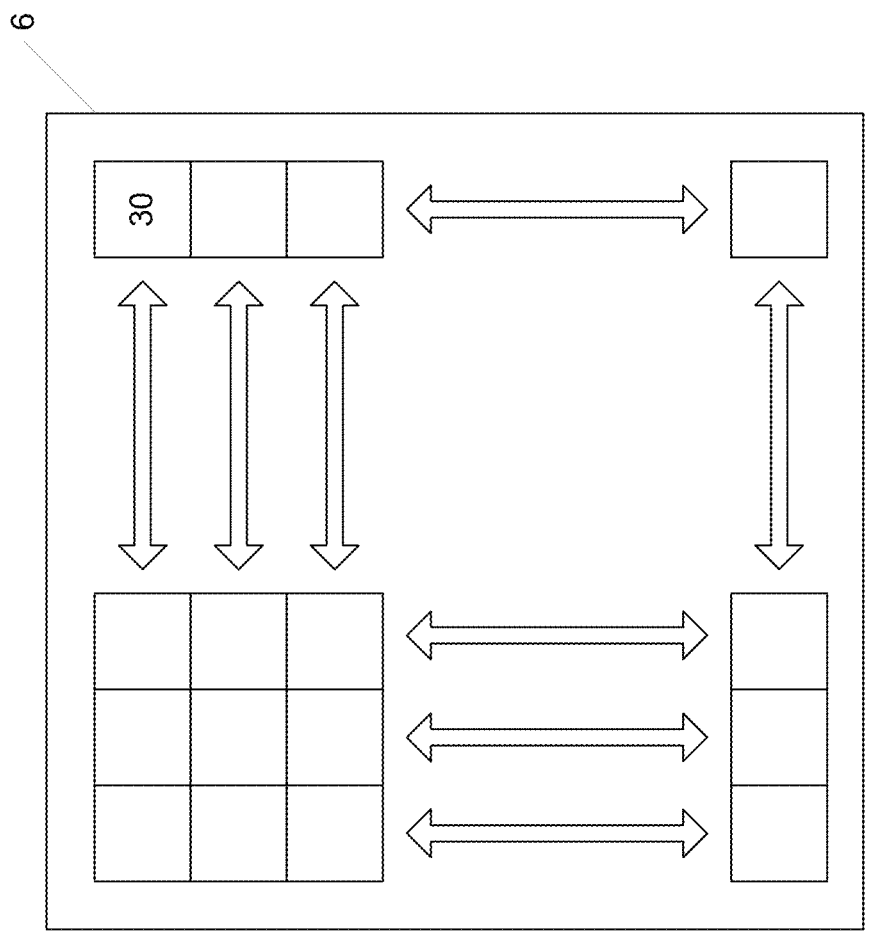
FIG. 2 shows a panel of a multiple panel display.

FIG. 2 shows a single panel or tile 6 of a multititled display 2. Typically each panel in the display is the same as the other panels and the panels are interconnected to form the display. The panel shown has a square shape, but the panel can be any desirable shape such as triangular, rectangular, trapezoidal, hexagonal, or octagonal. In a specific implementation, the panel is 400 millimeters by 400 millimeters in size.

The panel has a number of pixels 30 arranged in an array of rows and columns. A panel can have any number of rows and columns of pixels. In a specific implementation, the panel has 24 pixels by 24 pixels per panel. This panel has a pixel density of 3600 pixels per square meter. In another specific implementation, the panel has 36 pixels by 36 pixels per panel. This panel has a pixel density of 8100 pixels per square meter.

Figure 3:
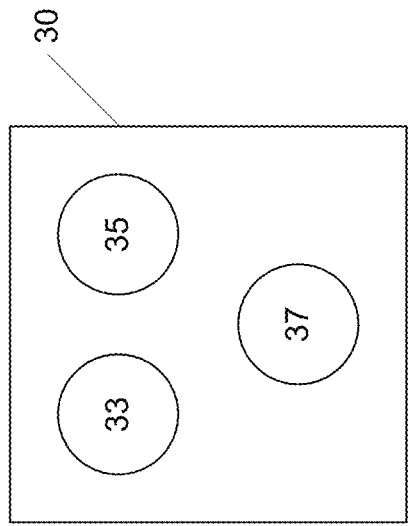
FIG. 3 shows a first pixel element implementation.

FIG. 3 shows a first implementation of a pixel element 30 of a panel. For example, there will be 576 (24*24) or 1296 (36*36) of these pixels in a panel. This pixel element has three LEDs, each of a different color. An LED 33 is red, an LED 35 is green, and an LED 37 is blue. In other implementations, the colors can be a different color set. With its LEDs, the pixel element can display different colors by mixing of the three LED colors. In a specific implementation, the color depth is 16 bits per color.

Figure 4:
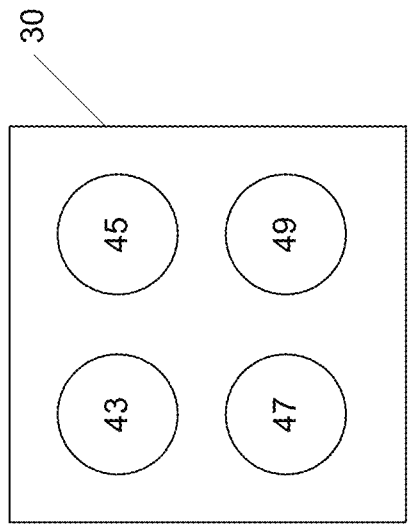
FIG. 4 shows a second pixel element implementation.

FIG. 4 shows a second implementation of a pixel element 30 of a panel. Compared to the pixel element of FIG. 3, there is an additional LED of a different color than the other three. This pixel element has four LEDs, each of a different color. An LED 43 is red, an LED 45 is green, an LED 47 is cyan, and an LED 49 is blue. The cyan LED, which is a bluish-green color, has a wavelength of 505 nanometers or 515 nanometers. In a specific implementation, the color depth is 16 bits per color.

With its LEDs, the pixel element can display different colors by mixing of the four LED colors. The additional pixel element allows the pixel element and consequently the entire display to have an enhanced and greater color gamut than a panel with the three color elements. In other implementations, a pixel element can have more than four LEDs, such as 5, 6, 7, or 8 LEDs per pixel, each a different color than the other pixels.

Figure 5:
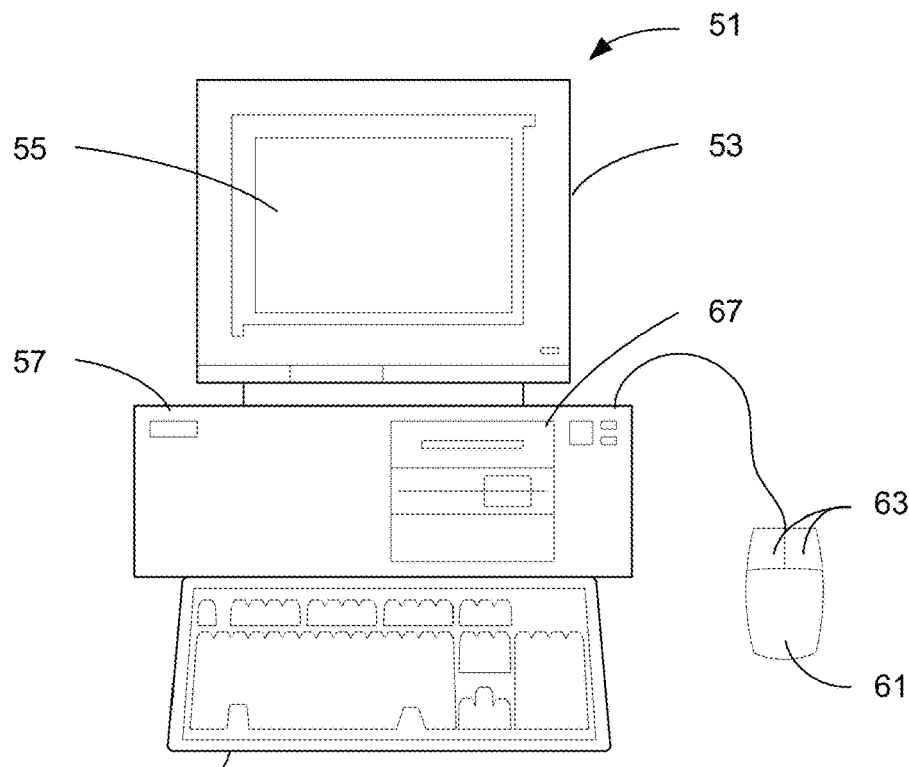
FIG. 5 shows a system of the present invention for performing a technique of the invention.

FIG. 5 shows an implementation of a system of the present invention. In an embodiment, the invention is a technique (such as in software or firmware) that executes on an electronic computing or computer system (e.g., stand-alone computer, client, or server), such as shown in FIG. 5. FIG. 5 shows a computer system 51 that includes a monitor 53, screen 55, enclosure 57, keyboard 59, and mouse or pointing device 61. Mouse 61 may have one or more buttons such as mouse buttons 63. Enclosure 67 (may also be referred to as a system unit, cabinet, or case) houses familiar computer components, some of which are not shown, such as a processor, memory, mass storage devices 67, and the like.

Mass storage devices 67 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive or SSD), battery-backed-up volatile memory, tape storage, reader, and other similar media, and combinations of these.

A computer-implemented or computer-executable version (e.g., a computer program product) of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 67. The source code of the software of the present invention may also be stored or reside on mass storage device 67 (e.g., hard disk, magnetic disk, tape, or CD-ROM). As a further example, code of the invention may be transmitted via wires, radio waves, or through a network such as the Internet.

Figure 6:
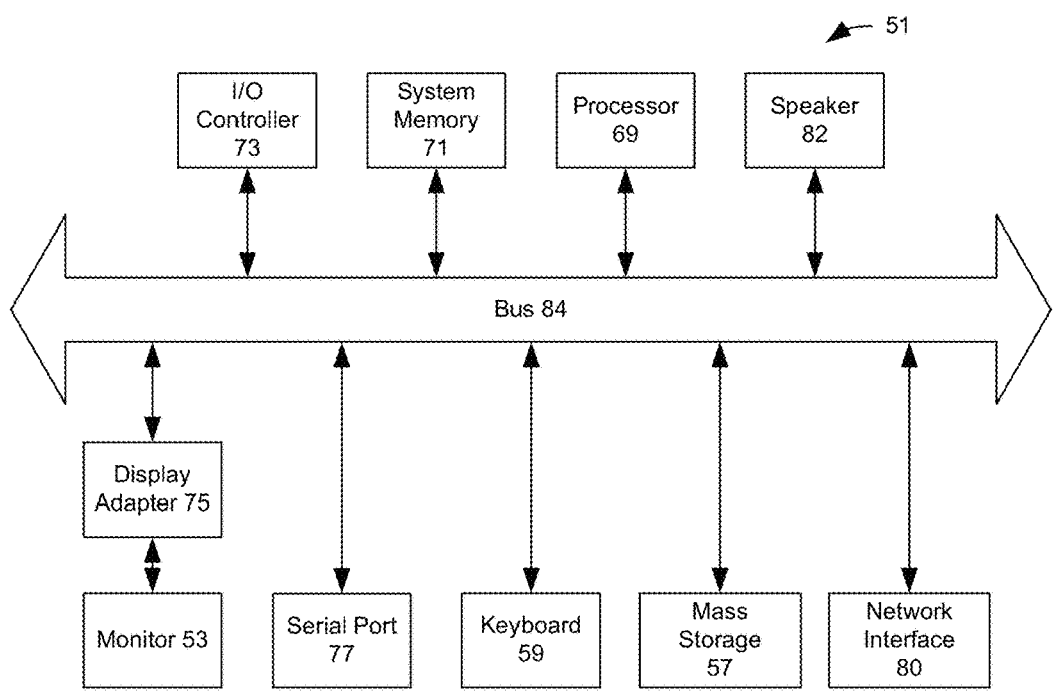
FIG. 6 shows a simplified system block diagram of a computer system used to execute code for a technique of the invention.

FIG. 6 shows a system block diagram of computer system 51 used to execute software of the present invention. As in FIG. 5, computer system 51 includes monitor 53, keyboard 59, and mass storage devices 67. Computer system 51 further includes subsystems such as central processor 69, system memory 71, input/output (I/O) controller 73, display adapter 75 (which can include one or more graphics processing units (GPUs)), serial or universal serial bus (USB) port 77, network interface 80, and speaker 82. The invention may also be used with computer systems with additional or fewer subsystems. For example, a computer system could include more than one processor 69 (i.e., a multiprocessor system) or the system may include a cache memory.

The processor may contain multiple processor cores (e.g., two, three, or four or more) on a single integrated circuit. The system may also be part of a distributed computing environment or grid. In a distributed computing environment, individual computing systems are connected to a network and are available to lend computing resources to another system in the network as needed. The network may be an internal or local Ethernet network (e.g., 10, 100, or 1000 megabits per second Ethernet), Internet, or other network. The system may include one or more graphics processing units, which may reside on the display adapter or be part or another subsystem.

Arrows such as 84 represent the system bus architecture of computer system 51. However, these arrows are illustrative of any interconnection scheme serving to link the subsystems. For example, speaker 82 could be connected to the other subsystems through a port or have an internal connection to central processor 69. Computer system 51 is but an example of a computer system suitable for use with the present invention. Other configurations of subsystems suitable for use with the present invention will be readily apparent to one of ordinary skill in the art.

The system can have one or more display or graphics adapters, each having one or more GPUs. When a system has multiple GPUs, these GPUs can be connected via the system bus. Or the GPUs may be also directly connected together via another separate bus (e.g., Nvidia SLI bus, ATI CrossFire bus, PCI-E bus, or other). These GPUs typically reside on display or graphics adapter 75 and connect to the monitor or display via a display interface such as VGA, DVI, HDMI, or DisplayPort.

The architecture of a GPU can vary depending on the manufacturer. A GPU is generally a massively parallel processor architecture designed for the specific purpose of performing graphics calculations to be displayed on a screen. Many calculations and transformations are used to render three-dimensional graphics and animation in real-time. The GPU accelerates such tasks. However, there are many tasks that a GPU is not designed and cannot handle, such as general processing tasks which is handled by the CPU. Features of a GPU can be incorporated in an application specific integrated circuit (ASIC) or field programmable gate array (FPGA).

Some components of a GPU include shaders, vertex processors, texture processors, fragment processors, z-compare and blend components, texture cache, vertex cache, and shadow buffer. Some shaders include vertext shaders, geometry shaders, and pixel shaders. A shader is a set of software instructions, primarily to calculate rendering effects in the GPU.

Computer software products may be written in any of various suitable programming languages, such as C, C++, C#, Pascal, Fortran, Perl, Matlab (from MathWorks, Inc.), SAS, SPSS, Java, or JavaScript, or any combination of these. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems).

An operating system for the system may be one of the Microsoft Windows® family of operating systems (e.g., Windows 95, 98, Me, Windows NT, Windows 2000, Windows XP, Windows XP x64 Edition, Windows Vista, Windows 7, Windows CE, Windows Mobile), Linux, HP-UX, UNIX, Sun OS, Solaris, Mac OS X, Alpha OS, AIX, IRIX32, or IRIX64, or combinations of these. Microsoft Windows is a trademark of Microsoft Corporation. Other operating systems may be used. A computer in a distributed computing environment may use a different operating system from other computers.

Furthermore, the computer may be connected to a network and may interface to other computers using this network. For example, each computer in the network may perform part of the task of the many series of steps of the invention in parallel. Furthermore, the network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In the discussion below, this patent uses the DVI interface as an example of a specific application and implementation of the principles of the invention. One skilled in the art will recognize that the principles of the invention are applicable to other interfaces including HDMI, DFP, DisplayPort, SDI, and VGA, with any changes as needed, without departing from the scope of the invention.

Figure 7:
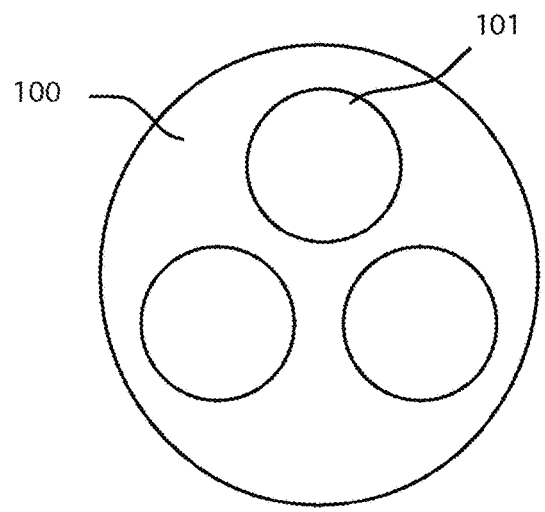
FIG. 7 is a diagram of a single pixel module in accordance with an embodiment of the invention.

FIG. 7 is a diagram of a single pixel module 100 in accordance with an embodiment of the invention. The pixel module 100 may contain multiple light emitting elements 101. Three light emitting elements 101 are used in this embodiment; however, the invention is not so limited and any number of light emitting elements 101 may be used. The light emitting elements 101 may be the same or different colors. At least one of the light emitting elements 101 may be capable of being utilized as both a light emitter and a light receptor.

In one embodiment of the disclosure, the light emitting elements 101 are light emitting diodes. Light emitting diodes or LEDs. LEDs are semiconductor devices that emit light when an electrical current flows through them. However, LEDs can also be connected and used as light detectors where they produce an output voltage when illuminated with light. A semiconductor junction diode exhibits some degree of photosensitivity when it receives light of an appropriate wavelength. The spectral response of a specific semiconductor diode when used as a receptor depends on many factors, including the materials used in the manufacture of the diode, the geometry of the junction and the packaging of the diode. The packaging of most semiconductor diode devices aims to inhibit sensitivity to light to maintain stability of the normal properties of the device. However, the construction of an LED normally acts in both directions and allows light into the junction as well as letting it out. LEDs, therefore, can behave and be used as narrowband photodetectors. Suitable circuitry may allow the selectable use of a single LED in either the light-emitting mode or light-detecting mode without adversely affecting its performance as a light emitter.

Figure 8:
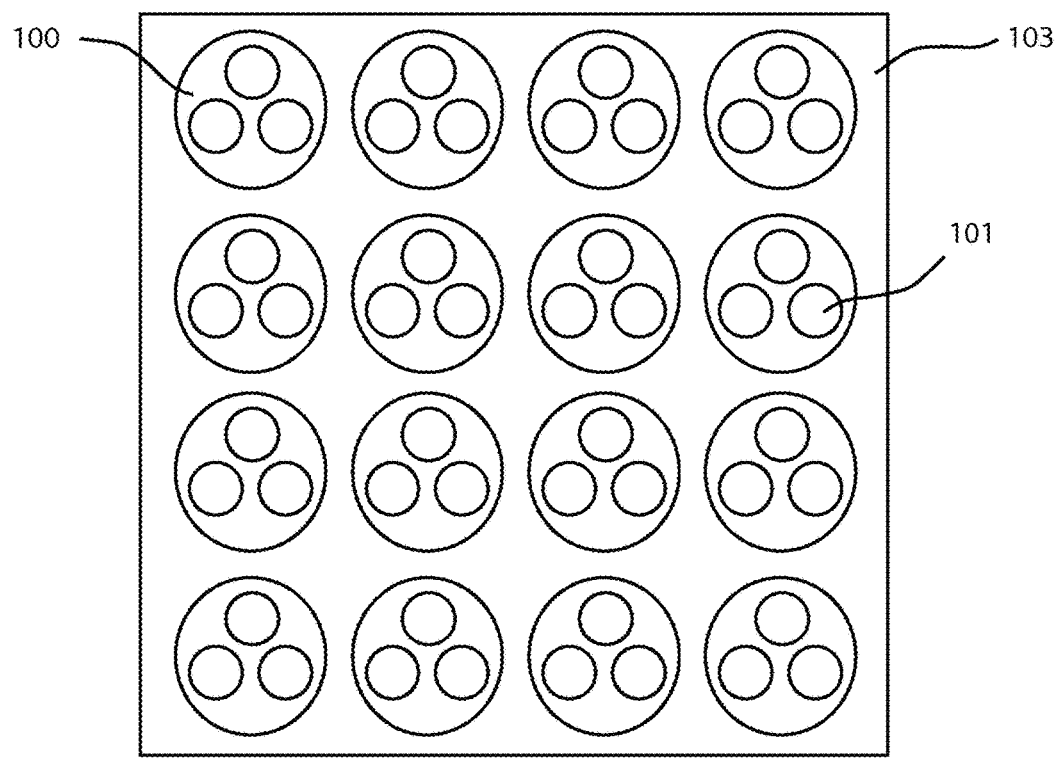
FIG. 8 is a diagram of a single display module of an LED display in accordance with an embodiment of the invention.

FIG. 8 is a diagram of a single display module 103 of an LED display in accordance with an embodiment of the invention. Display module 103 includes multiple pixel modules 100, such as depicted in FIG. 7. Any number of pixel modules 100 may be placed in any arrangement on the display module 103 without departing from the invention. FIG. 8 shows a possible embodiment where the pixel modules 100 are arranged in a 4×4 array on the display module 103. In this embodiment, each pixel module 100 contains light emitting elements 101. At least one of the light emitting elements 101 on display module 103 is also capable of acting as a light receptor.

Figure 9:
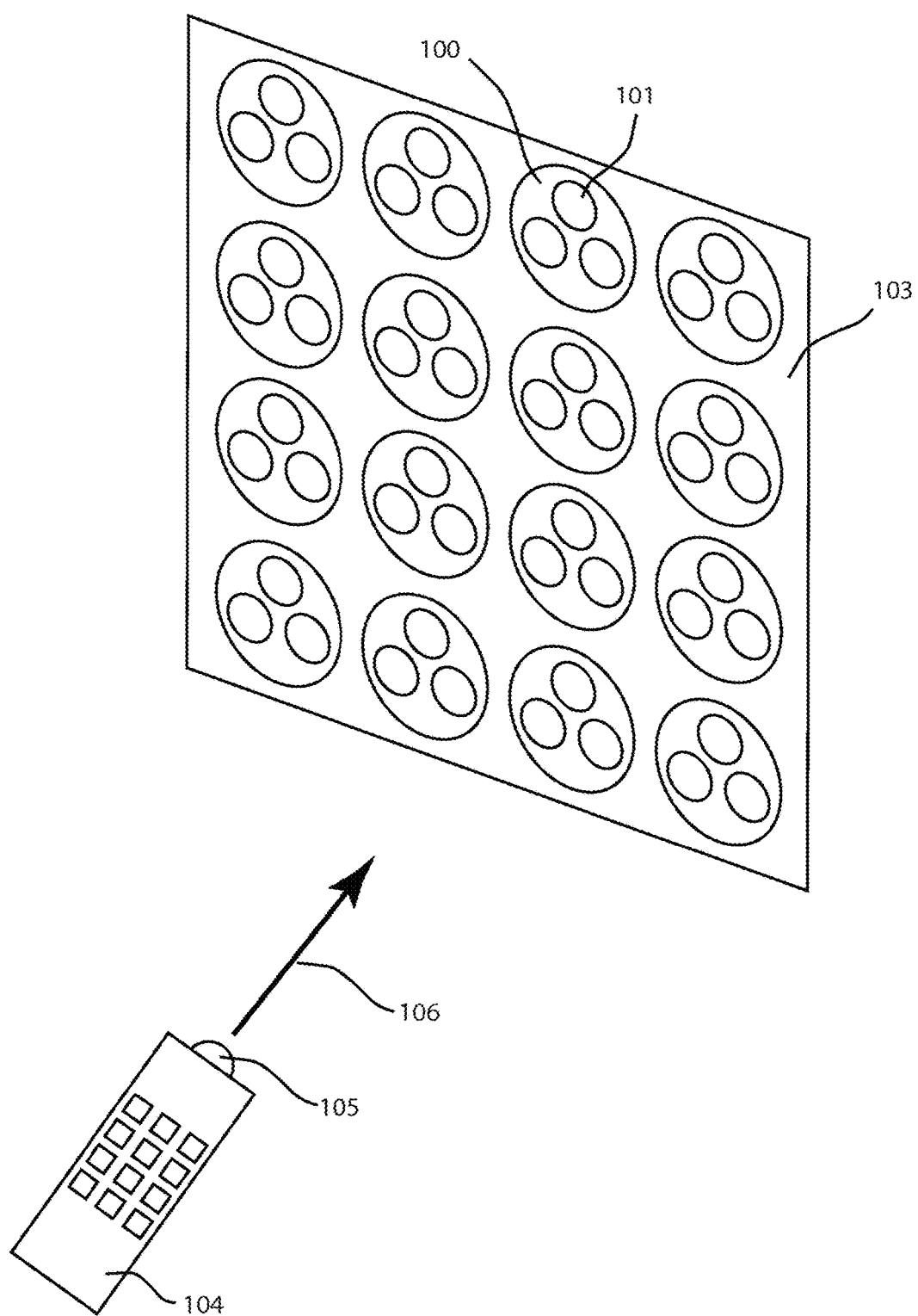
FIG. 9 is a diagram of an interactive device and a single display module in accordance with an embodiment of the invention.

FIG. 9 is a diagram of a control device 104 (which may also be called an input device) and a single display module 103 in accordance with an embodiment of the invention. Control device 104 may be a handheld device containing a light emitting element 105, such as a laser, LED, or other light emitter known in the art, which emits a coded signal 106, such as a coded light signal. The signal 106 may be radiation or light of a wavelength suitable for reception by a light emitting element 101 acting as a detector.

The optimal color of light used for transmission may not be the same as the light emitted by an LED when it is used as an emitter. For example, red LEDs are typically most sensitive to orange light when used as a receptor and, in general, an LED is usually sensitive as a receptor to light slightly shorter in wavelength than the light it emits when acting as a light source. The coding system used in signal 106 may be selected from many coding systems, including, but not restricted to: pulse-width modulated, pulse-amplitude modulated, phase modulated, amplitude modulated, and frequency modulated.

Light emitting element 101 acts as a receptor on display module 103 and receives the coded signal 106. A processor, e.g. a local microcontroller or other logic element (not shown), processes and decodes the signal 106. The processor may be attached to the display module 103, or the processor may only need to be electrically connected to the display module 103.

For purposes of discussion, we describe a single light emitting element being used as a receptor. However any number, one, two, three, or all the LEDs of a pixel element, can be used as receptors. These multiple LED receptors can act like a compound eye to further enhance the detection of signals. Combining multiple LEDs together for detection increases the detection band to be greater than the band available with a single LED. Therefore, the detection sensitivity increases and the receptors will be able to detect even more subtle light changes.

In a specific embodiment of the invention, the coded signal 106 from the control device 104 will contain data allowing the setting of address of display module 103. This system allows an individual display module 103 to be replaced in a display system and then "shot" with the control device 104 to address the display module 103. A display module 103 may thus be "hot-swapped" or replaced in a maintenance situation while the display is in normal operation with a minimal amount of disruption. There is no need to switch the display into a special maintenance or test mode which would be visible to the audience or a viewer.

In a further embodiment, additional security for the system is provided by ensuring that the coded signal 106 from the control device 104 is dynamic and unique. To facilitate this process, the coded signal 106 may include data identifying the specific control device 104 sending the signal. In subsequent operation, the display module 103 may confirm that this particular interactive device 104 is authorized to send commands.

Figure 10:
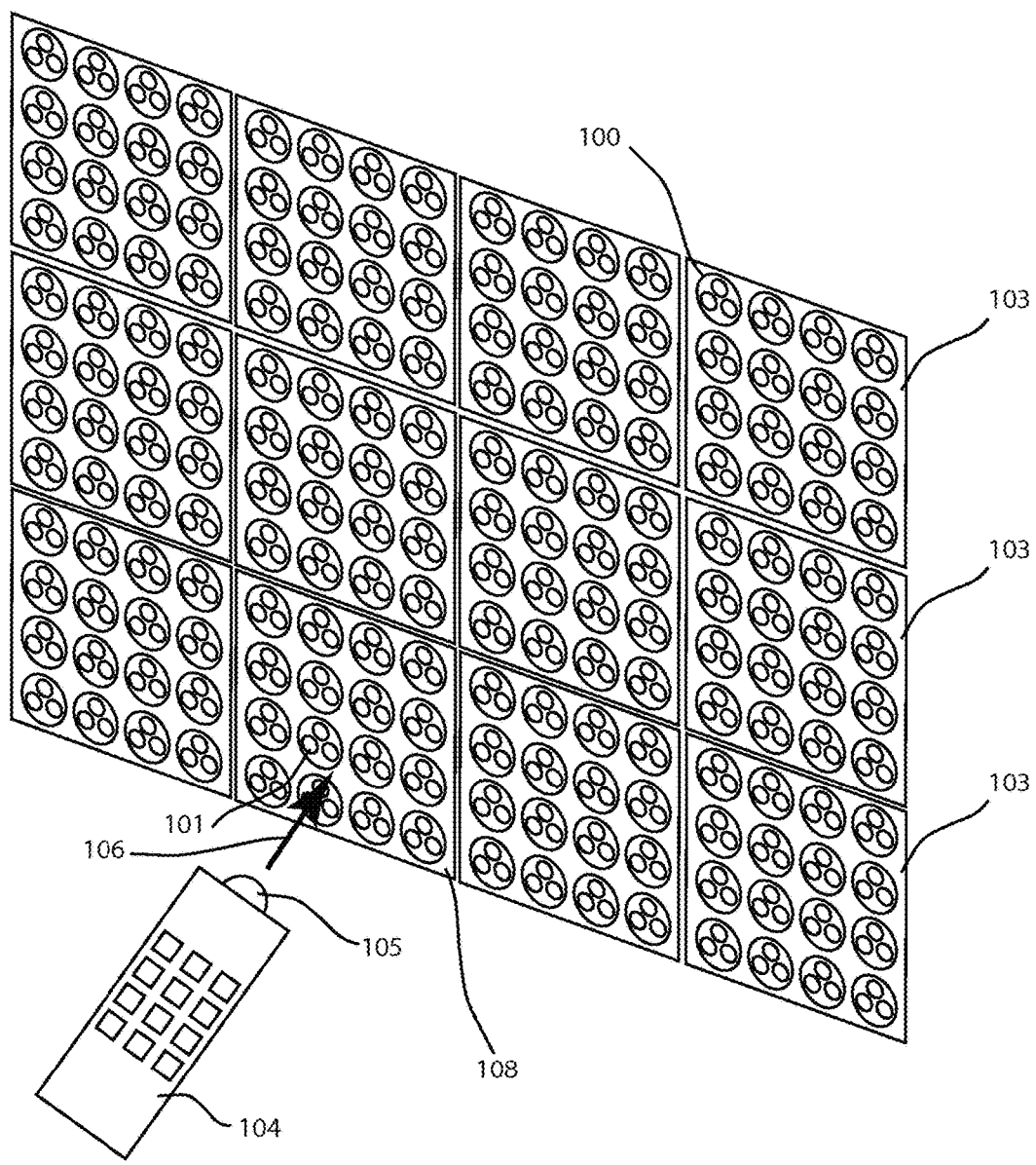
FIG. 10 is a diagram of the interactive device and multiple display modules in accordance with an embodiment of the invention.

FIG. 10 is a diagram of the control device 104 and multiple display modules 103 in accordance with an embodiment of the invention. A larger display is illustrated here containing multiple display modules 103, each of which contains multiple pixel modules 100. By a similar arrangement to that described above for FIG. 9, a display module 103 may be hot-swapped or replaced in a maintenance situation while the display is in normal operation with a minimal amount of disruption. There is no need to switch the display into a special maintenance or test mode which would be visible to the audience or a viewer. The control device 104 may be positioned close to a specific display module 108 such that only one or more of the light emitting elements 101 acting as light receptors on that display module 108 receive the coded signal 106 and only that single display module 108 will respond to that coded signal, thereby leaving other display modules 103 unaffected.

In an implementation, the display panels can receive control information from control device 104. The control information can be, e.g., address information as discussed above. Or the control information can be used to control lighting in the room, brightness of the screen, contrast of the screen, and the like. For example, by supplying a dim screen code from the control device, the user can dim the screen of the display without needing to be connected through a wired or network connection to the display. In fact, the panel may be disconnected form a network of the display system, and the control device can still be used to control functionality of the display. The data sent by the control device and received by the photoceptors of the screen can be stored in a memory of a panel or processed by a processor of a panel, or a combination of these.

Figure 11:
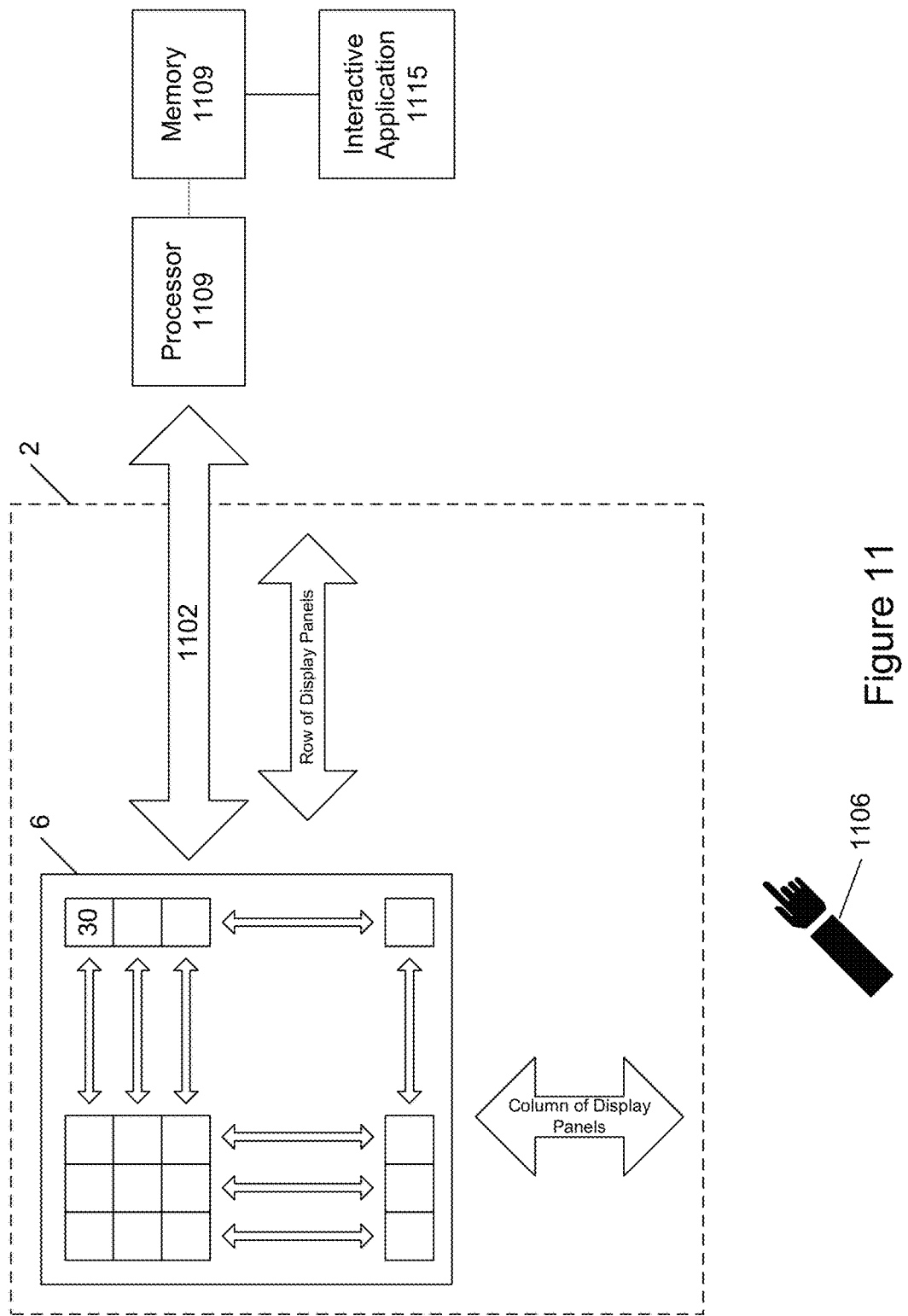
FIG. 11 shows a system with multipanel display with combination light emitters and photodetectors that are responsive to input sources which is not an active light source.

FIG. 11 shows display 2 with panel 6 having LED pixel elements, where at least one these elements in addition to emitting light, also detects light. There are rows and columns of panels, similar to shown in FIG. 1 and described above. Each of the panels and pixels is electrically connected to a processor (via an electrical connection 1102), which may be part of a video controller like described above).

This processor may be a general purpose processor like a CPU or a specialized processor like a GPU. The processor may be housed or enclosed in the panel, where each panel has its own processor. Or one or more processors may be external to the delay, and connected to the panels electrically via an interface cable. Further in another implementation, there may be a external processor that works in conjunction with individual processors in each panel.

Any light changes will be detected by the photodetectors in each of the pixel elements. These light changes may be from a light source such as described previously in FIGS. 9 and 10. Further, the light changes detected may be from an input source 1106 that is not an active light source (such as a person's finger, hand, head, leg, or foot). The photodetectors will detect changes in the ambient lighting in front of the display.

Because the pixel elements and display panels are arranged in an array, the processor can detect the motion, positioning, and change in positioning of the input source. For example, if a person were to move a hand from left to right, the processor would, through the photodetectors, detect that this has occurred. Also, if the hand can move to a specific position of the screen and the photodetectors and processor can detect this too. Since the photodetectors detect light movement, the hand or input source does not need to actually touch the screen.

This display that has both light emitting and light detecting elements. Interactive application software 1115 can use both features to make interactive content for users. The interactive application is stored in a memory 1109, which controls the operation of the processor, and receives motion and positioning information from the processor too.

For example, the interactive application may be a game program that shows an avatar on the screen. The user stands in front of the screen and waves his two arms. The interactive application receives this information about motion and directs the avatar on display to move its arms in the same way. There are number ways interactive applications can use the features of a display of the invention.

A specific flow for an interactive display of the invention is presented below, but it should be understood that the invention is not limited to the specific flows and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data.

An interactive display flow, which can execute on a process and stored in memory, is:

1. Display an initial interactive screen for a user, where the user can interact with graphical elements of the display. For example, this screen may have buttons, avatars, graphics objects, and other types of elements. The interactive screen may be a game program.

2. The processor determines a baseline lighting level of one or more input sources (e.g., one or more users) in front of the display.

3. Upon motion by the input source or user, the interactive software application receives information about this motion. For example, the user may have indicated touching of a button places at a particular location on the display. The user may have made a hand gesture such as flipping a page. The user may move two or more motions such waving both hands.

4. The interactive program determines the motion the user makes and alters what is displayed on the screen in response. For example, if the user motions like touching a first button on the screen (without actually touching the screen), the program displays a second interactive screen. While if the user motions like touching a second button on the screen, at a different location than the first button, the program displays a second interactive screen different from the first.

5. The interactive program can also move objects on the screen in response to how the user moves. For example, if the user is dancing, a simulated partner on the screen can appear to dance with the user. The user can make a motion like hitting a ball, a ball object being drawn by the processor is altered on the display to appear as though the user hit the ball (and recreates the accompany physics).

In particular, the interactive program shows an object on the screen. The photodetective and consequently the interactive program detects motion by the user. The interactive program draws the object on the screen differently than was previously drawn in response to the user's motion.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
providing a display comprising a plurality of display panels that are releasably coupled;
providing that each display panel comprises a plurality of light emitting elements;
allowing a first display panel of the plurality of display panels to be decoupled from a second display panel of the plurality of display panels and removed from the display;
allowing a third display panel to couple to the second display panel to replace the first display panel in the display;
configuring a first light emitting element of the third display panel to emit a first wavelength of light in a first range of wavelengths and detect a second wavelength of light in a second range of wavelengths, wherein the first and second ranges of wavelengths are different ranges of wavelengths;
configuring a second light emitting element of the third display panel to emit a third wavelength of light and not detect light,
configuring a third light emitting element of the third display panel to emit a fourth wavelength of light and not detect light, wherein the first, third, and fourth wavelengths are different wavelengths;
providing for the first light emitting element to receive a coded light signal transmitted from a control unit, wherein light of the coded light signal includes the second wavelength and the coded light signal includes address information; and
configuring a processor to communicate with the third display panel using the address information.

2. The method of claim 1 comprising allowing the processor to set the address of the third display panel based on the address information.

3. The method of claim 1 configuring a memory of the third display panel to store an address based on the address information.

4. The method of claim 1 comprising configuring the display to include the processor.

5. The method of claim 1 configuring the first, second and third light emitting elements to form a pixel.

6. The method of claim 1 configuring a fourth light emitting element of the third display panel to emit a fifth wavelength of light and not detect light, wherein the first, third, fourth, and fifth wavelengths are different wavelengths.

7. The method of claim 6 wherein the first, third, fourth, and fifth wavelengths include blue, green, red, and cyan.

8. The method of claim 6 allowing the first display panel of the plurality of display panels to be decoupled from a fourth display panel of the plurality of display panels for removal from the display; and allowing the third display panel to couple to the fourth display panel when replacing the first display panel in the display.

9. The method of claim 8 allowing the first display panel of the plurality of display panels to be decoupled from a fifth display panel of the plurality of display panels for removal from the display; and allowing the third display panel to couple to the fifth display panel when replacing the first display panel in the display.

10. The method of claim 9 allowing the first display panel of the plurality of display panels to be decoupled from a sixth display panel of the plurality of display panels for removal from the display; and allowing the third display panel to couple to the sixth display panel when replacing the first display panel in the display.

11. A method comprising:
providing a display comprising a plurality of display panels that are releasably coupled, wherein each display panel comprises a plurality of light emitting elements;
decoupling a first display panel of the plurality of display panels from a second display panel of the plurality of display panels for removing the first display panel from the display;

coupling a third display panel to the second display panel for replacing the first display panel in the display with the third display panel, wherein a first light emitting element of the third display panel is adapted to emit a first wavelength of light in a first range of wavelengths and detect a second wavelength of light in a second range of wavelengths, the first and second ranges of wavelengths are different ranges of wavelengths, a second light emitting element of the third display panel is adapted to emit a third wavelength of light and not detect light, and a third light emitting element of the third display panel is adapted to emit a fourth wavelength of light and not detect light, wherein the first, third, and fourth wavelengths are different wavelengths;

transmitting a coded light signal to the first light emitting element, wherein light of the coded light signal includes the second wavelength and the coded light signal includes address information;

receiving by the first light emitting element the coded light signal; and setting an address for the third display panel based on the address information.

12. The method of claim 11 wherein transmitting the coded light signal to the first light emitting element comprises transmitting the coded light signal to the first light emitting element from a remote control unit.

13. The method of claim 11 comprising transmitting, by a processor to the display, a command that includes the address for the third display panel based on the address information; and receiving the command by the third display panel based on the address.

14. The method of claim 13 wherein setting the address comprises setting the address based on the command received from the processor.

15. The method of claim 11 wherein the first, second, and third light emitting elements form a pixel.

16. The method of claim 11 decoupling the first display panel from a fourth display panel of the plurality of display panels for removing the first display panel from the display; and coupling the third display panel to the fourth display panel when replacing the first display panel in the display with the third display panel.

17. The method of claim 16 decoupling the first display panel from a fifth display panel of the plurality of display panels for removing the first display panel from the display; and
coupling the third display panel to the fifth display panel when replacing the first display panel in the display with the third display panel.

18. The method of claim 17 decoupling the first display panel from a sixth display panel of the plurality of display panels for removing the first display panel from the display; and coupling the third display panel to the sixth display panel when replacing the first display panel in the display with the third display panel.

19. The method of claim 11 wherein prior to the third display panel being positioned in the display, an address for the third display panel is not set to the address based on the coded information.

20. A light emitting display system comprising:

a plurality of display units, wherein the display units are detachably coupled to form a display portion of the light emitting display, each display unit is individually detachable from the display portion without detaching other display units from the display portion, each of the display units comprises a light emitting element adapted to emit light in a first range of wavelengths and adapted to detect light in a second range of wavelengths, the first and second ranges of wavelengths are different ranges of wavelengths, and each display unit has a unique address assignable individually via coded information transmitted to the display unit in the second range of wavelengths and the coded information comprises first address information for an address for the display unit; and a processor, electronically coupled to the display units, wherein the processor is adapted to receive the first address information from a first display unit of the plurality of display units when at least one of the light emitting elements of the first display unit receives the first address information in the coded information that is transmitted in the second range of wavelengths to the first display unit the processor is adapted to electronically address the first display unit of the plurality of display units with second address information that includes the unique address for the first display unit, and the second address information is based on the received first address information.

21. The light emitting display system of claim 20 wherein a remove control device is adapted to transmit the coded information to the first display unit.

22. The light emitting display system of claim 20, wherein each of the plurality of light emitting elements is adapted to receive a light signal.

* * * * *